(12) United States Patent
Cheng

(10) Patent No.: US 11,552,747 B2
(45) Date of Patent: Jan. 10, 2023

(54) SELECTIVE REPEAT ARQ ENHANCEMENT FOR HDL DATA TRANSFER

(71) Applicant: Rockwell Collins, Inc., Cedar Rapids, IA (US)

(72) Inventor: Ho Ting Cheng, Stittsville (CA)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/208,712

(22) Filed: Mar. 22, 2021

(65) Prior Publication Data

US 2022/0303068 A1    Sep. 22, 2022

(51) Int. Cl.
*H04L 1/18* (2006.01)
*H04L 1/16* (2006.01)

(52) U.S. Cl.
CPC .......... *H04L 1/1896* (2013.01); *H04L 1/1642* (2013.01); *H04L 1/1809* (2013.01); *H04L 1/1832* (2013.01)

(58) Field of Classification Search
CPC ............... H04W 72/042; H04W 76/27; H04W 74/0833; H04L 5/0048; H04L 5/0053
See application file for complete search history.

(56) References Cited

U.S. PATENT DOCUMENTS

2017/0187496 A1*  6/2017  Shalev ................. H04L 69/324

\* cited by examiner

*Primary Examiner* — Jamal Javaid
(74) *Attorney, Agent, or Firm* — Suiter Swantz pc llo

(57) ABSTRACT

A system and method for transmitting and relaying data packets within an ARQ 3G HDL framework includes populating unused packet positions with unacknowledged packets during retransmission. The unused packet positions are populated according to lowest unacknowledged sequence numbers. Unused packet positions may be populated with multiple copies of the lowest unacknowledged sequence number or some set of the lowest unacknowledged sequence numbers. A set of lowest sequence unacknowledged sequence numbers may be weighted toward the lowest unacknowledged sequence number to increase the probability of the lowest unacknowledged sequence number being received so that the send window can be slid forward.

20 Claims, 8 Drawing Sheets

FIG. 2A

1st HDL-24 transmission

| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Sequence Number | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| ACK or NACK | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ | ✓ |

FIG. 2B

2nd HDL-24 transmission

| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| ACK or NACK | ✓ | ✓ | ✓ | ✓ | ✓ | ✓ | ✓ | X | X | X | X | X | X | X | X | X | ✓ | ✓ | ✓ | ✓ | ✓ | ✓ | ✓ | ✓ |

FIG. 2C

3rd HDL-24 transmission

| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Sequence Number | 48 | 49 | 50 | 51 | 52 | 53 | 54 | 31 | 32 | 33 | 34 | 35 | 36 | 37 | 38 | 39 | 55 | 56 | 57 | 58 | 59 | 60 | 61 | 62 |
| ACK or NACK | ✓ | ✓ | ✓ | ✓ | ✓ | ✓ | ✓ | X | X | X | X | X | X | X | X | X | ✓ | ✓ | ✓ | ✓ | ✓ | ✓ | ✓ | ✓ |

FIG. 2D

4th HDL-24 transmission

| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
| ACK or NACK | ✓ | ✓ | ✓ | ✓ | ✓ | ✓ | ✓ | X | X | X | X | ✓ | ✓ | ✓ | ✓ | ✓ | ✓ | ✓ | ✓ | ✓ | ✓ | ✓ | ✓ | ✓ |

5th HDL-24 transmission

| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | ? | ? | ? |
| ACK or NACK | ✓ | ✓ | ✓ | ✓ | ✓ | ✓ | ✓ | X | X | X | X | ✓ | ✓ | ✓ | ✓ | ✓ | ✓ | ✓ | ✓ | ✓ | ✓ | | | |

FIG.2E

| Embodiment 1: 5th HDL-24 transmission | | | | | | | | | | | | | | | | | | | | | | | | |
|---|---|---|---|---|---|---|---|---|---|---|---|---|---|---|---|---|---|---|---|---|---|---|---|---|
| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | 31 | 31 | 31 |
| ACK or NACK | ✓ | ✓ | ✓ | ✓ | ✓ | ✓ | ✓ | X | X | X | X | ✓ | ✓ | ✓ | ✓ | ✓ | ✓ | ✓ | ✓ | ✓ | ✓ | | | |

FIG. 3

| Embodiment 2: 5th HDL-24 transmission | | | | | | | | | | | | | | | | | | | | | | | | |
|---|---|---|---|---|---|---|---|---|---|---|---|---|---|---|---|---|---|---|---|---|---|---|---|---|
| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | 31 | 31 | 32 |
| ACK or NACK | ✓ | ✓ | ✓ | ✓ | ✓ | ✓ | ✓ | X | X | X | X | ✓ | ✓ | ✓ | ✓ | ✓ | ✓ | ✓ | ✓ | ✓ | ✓ | | | |

FIG. 4

| Embodiment 2: 5th HDL-24 transmission | | | | | | | | | | | | | | | | | | | | | | | | |
|---|---|---|---|---|---|---|---|---|---|---|---|---|---|---|---|---|---|---|---|---|---|---|---|---|
| HDL Packet Position | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Sequence Number | 24 | 25 | 26 | 27 | 28 | 29 | 30 | 31 | 32 | 33 | 34 | 35 | 36 | 37 | 38 | 39 | 40 | 41 | 42 | 43 | 44 | 31 | 32 | 33 |
| ACK or NACK | ✓ | ✓ | ✓ | ✓ | ✓ | ✓ | ✓ | X | X | X | X | ✓ | ✓ | ✓ | ✓ | ✓ | ✓ | ✓ | ✓ | ✓ | ✓ | ⧄ | ⧄ | ⧄ |

FIG. 5

SELECTIVE REPEAT ARQ ENHANCEMENT FOR HDL DATA TRANSFER

BACKGROUND

In 3G automatic link establishment, high-throughput data link (HDL) traffic is supported by selective retransmission (ARQ) to achieve error-free data transfer. Unacknowledged packets must be received to clear the HDL packet position and allow the send window to be shifted or slid to accommodate new data packets. Existing algorithms having defined HDL frame sizes include inefficiencies in the retransmission process because no new data packets can be included due to protocol constrains until unacknowledged packets are received, and the unacknowledged packets are tied to their packet position. It would be advantageous to have a system and method for more efficiently retransmitting unacknowledged data packets.

SUMMARY

In one aspect, embodiments of the inventive concepts disclosed herein are directed to a system and method for transmitting and relaying data packets within an ARQ 3G HDL framework. Unacknowledged packets are used to populate unused packet positions during retransmission.

In a further aspect, the unused packet positions are populated according to lowest unacknowledged sequence numbers. Unused packet positions may be populated with multiple copies of the lowest unacknowledged sequence number or some set of the lowest unacknowledged sequence numbers. A set of lowest sequence unacknowledged sequence numbers may be weighted toward the lowest unacknowledged sequence number to increase the probability of the lowest unacknowledged sequence number being received so that the send window can be slid forward.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 2A shows a block representation of a populated HDL-24 transmission frame during a transmission process;

FIG. 2B shows a block representation of a populated HDL-24 transmission frame during a transmission process;

FIG. 2C shows a block representation of a populated HDL-24 transmission frame during a transmission process;

FIG. 2D shows a block representation of a populated HDL-24 transmission frame during a transmission process;

FIG. 2E shows a block representation of a populated HDL-24 transmission frame during a transmission process;

FIG. 3 shows a block representation of a populated HDL-24 transmission frame during a transmission process according to an exemplary embodiment;

FIG. 4 shows a block representation of a populated HDL-24 transmission frame during a transmission process according to an exemplary embodiment;

FIG. 5 shows a block representation of a populated HDL-24 transmission frame during a transmission process according to an exemplary embodiment;

DETAILED DESCRIPTION

Figure 1:
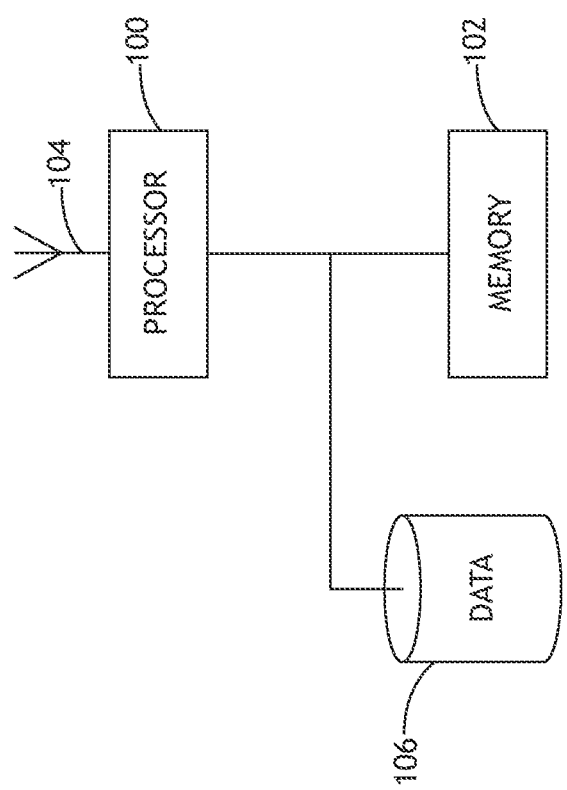
FIG. 1 shows a block diagram of a system useful for implementing exemplary embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for transmitting and relaying data packets within an ARQ 3G HDL framework. Unacknowledged packets are used to populate unused packet positions during retransmission. The unused packet positions are populated according to lowest unacknowledged sequence numbers. Unused packet positions may be populated with multiple copies of the lowest unacknowledged sequence number or some set of the lowest unacknowledged sequence numbers. A set of lowest sequence unacknowledged sequence numbers may be weighted toward the lowest unacknowledged sequence number to increase the probability of the lowest unacknowledged sequence number being received so that the send window can be slide forward.

Referring to FIG. 1, a block diagram of a system useful for implementing exemplary embodiments is shown. The system includes a processor 100, memory 102 connected to the processor 100 for embodying processor executable code, a data storage element 106 for storing data packets for transmission, and a data link element 104 such as a radio or antenna for a software defined radio, etc. The processor 100 instantiates an HDL frame and populates the HDL frame with data packets for transmission according to a 3G ALE ARQ protocol. The processor 100 than listens for acknowledgements of received data packets. After a period of time, or after a set of acknowledgements has been received, the processor 100 identifies unacknowledged data packets and flags them for retransmission based on an HDL packet position associated with each unacknowledged data packet.

In a subsequent transmission step, HDL packet positions associated with acknowledged data packets are populated by new data packets while unacknowledged data packets populate their respective HDL packet positions according to the original transmission for retransmission. In some circumstances, HDL packet positions may be unused due to protocol constrains on the way data packets are allocated to HDL frames that require lowest sequence number data packets to be acknowledged before new data packets can populate subsequent HDL frames.

Where the processor 100 identifies unused HDL packet positions, the processor 100 populates those unused HDL packet positions with unacknowledged data packets, in addition to populating those unacknowledged data packets at their original HDL packet position. Such redundant repopulation increases the probability of the unacknowledged data packets being received and acknowledged, thereby allowing the processor 100 to slide the send window of the HDL frame so that new data packets can be sent.

In at least one embodiment, the processor 100 populates all the unused HDL packet positions with the lowest sequence number unacknowledged data packet. Such overpopulation increases the probability of at least one copy of the lowest sequence number unacknowledged data packet being received.

In at least one embodiment, the processor 100 populates the unused HDL packet positions with a set of the lowest sequence number unacknowledged data packets; for example, the lowest and second lowest sequence number unacknowledged data packets. The lower sequence number unacknowledged data packet may populate more unused HDL packet positions than the second lowest sequence number unacknowledged data packet to bias successful reception toward the lowest sequence number unacknowledged data packet. Such population methodology increases the probability of at least one copy of the lowest sequence number unacknowledged data packet being received while also increasing the probability of second lowest sequence number unacknowledged data packet, and potentially sliding the HDL frame window more aggressively.

In at least one embodiment, the processor 100 populates the unused HDL packet positions with the same number of the lowest sequence number unacknowledged data packets, in order of sequence number. Such population methodology increases the probability of successfully retransmitting all of the unacknowledged data packets.

In at least one embodiment, the processor 100 records one or more secondary HDL packet positions associated with each unacknowledged data packet in an unused HDL packet position so that following acknowledgement messages may be cross-referenced even if the receiving system is unaware of the overpopulation methodology.

Once the lowest sequence number unacknowledged data packets are acknowledged, the processor 100 may slide the HDL frame send window and begin populating a subsequent HDL frame with new data packets. Depending on channel conditions, the overpopulation methodology provides a significant improvement over baseline retransmission algorithms. Using an HDL-24 frame in channel conditions where only a subset of data packets will require retransmission (for example, channels having a probability of success approximately 30%) the overpopulation methodology described herein may improve overall efficiency by approximately 10%.

Referring to FIGS. 2A-2E, block representations of a populated HDL-24 transmission frame during a transmission process are shown. In a first transmission step (as in FIG. 2A) data packets populate the frame according to data packet sequence number 202 in the HDL packet position 200 where the lowest data packet sequence number 202 populates to the lowest available HDL packet position 200. Acknowledgement 204 for each data packet is flagged as either acknowledged 206 or not acknowledged 208 based on feedback from the receiver or a timeout. For example, during a second transmission step (as in FIG. 2B), after all data packets from the first transmission step are flagged as acknowledged 206, new data packets populate the HDL frame sequentially according to new data packet sequence number 202 in a corresponding HDL packet position 200, and a set 210 of data packets are flagged as unacknowledged 208.

According to the 3G HDL protocol, during a third transmission step (as in FIG. 2C) the set 210 of data packets repopulate their HDL packet positions 200 for retransmission, and new data packets populate the remaining HDL packet positions 200 within constraints defined by the selective repeat ARQ protocol. Such retransmission may continue (such as in FIG. 2D) with unacknowledged packets being removed when retransmission is successful and a new set 214 of unacknowledged data packets comprising any data packets that continue to be unacknowledged.

At some point, if unacknowledged data packets persist, data packet sequence numbers 202 may reset between frames such that the next new data packet would have the same sequence number as the lowest sequence number of an unacknowledged data packet. In that case, no new data can be populated as sequence numbers are not permitted to overlap. Any remaining frame positions would thereby remain unused 222.

Referring to FIG. 3, a block representation of a populated HDL-24 transmission frame during a transmission process according to an exemplary embodiment is shown. Where a transmission process results in a set of data packets flagged as unacknowledged 306, and a set of unused frame positions, the unused frame positions may be populated with unacknowledged data packets to increase the probability of successful retransmission. In at least one embodiment, unused HDL packet positions 300 are all populated with the unacknowledged data packet having the lowest sequence number 304. Such population increases the probability of at least one copy of the lowest sequence number unacknowledged data packet being successfully received so that new data having that sequence number 302 may populate the next frame (i.e. slide the send window).

Referring to FIG. 4, a block representation of a populated HDL-24 transmission frame during a transmission process according to an exemplary embodiment is shown. In at least one embodiment, unused HDL packet positions 400 are all populated with a set of unacknowledged data packets sequentially according to sequence number 404, 406 starting with the lowest sequence number 404. The lowest sequence number 404 unacknowledged data packet may be replicated multiple times in some minimum number of unused frame positions, with a subsequent unacknowledged data packet 406 filling a smaller number of unused frame positions. Such population increases the probability of at least one copy of the lowest sequence number unacknowledged data packet 404 being successfully received and at least some increased probability of the subsequent unacknowledged data packet 406 being received. Such embodiment creates some possibility of a larger slide in the send window.

Referring to FIG. 5, a block representation of a populated HDL-24 transmission frame during a transmission process according to an exemplary embodiment is shown. In at least one embodiment, unused HDL packet positions 500 are all populated with a set of unacknowledged data packets sequentially according to sequence number 504, 506, 508 starting with the lowest sequence number 504. Such population increases the probability of some unacknowledged data packets being received.

While embodiments described herein show contiguous unacknowledged data packets, in may be appreciated that some situations may result in discontinuous unacknowledged data packets. In at least one embodiment, where unacknowledged data packets are discontinuous and unused HDL packet positions are defined intra-frame, the lowest sequence number unacknowledged data packet may populate all intra-frame unused HDL packet positions.

Figure 6:
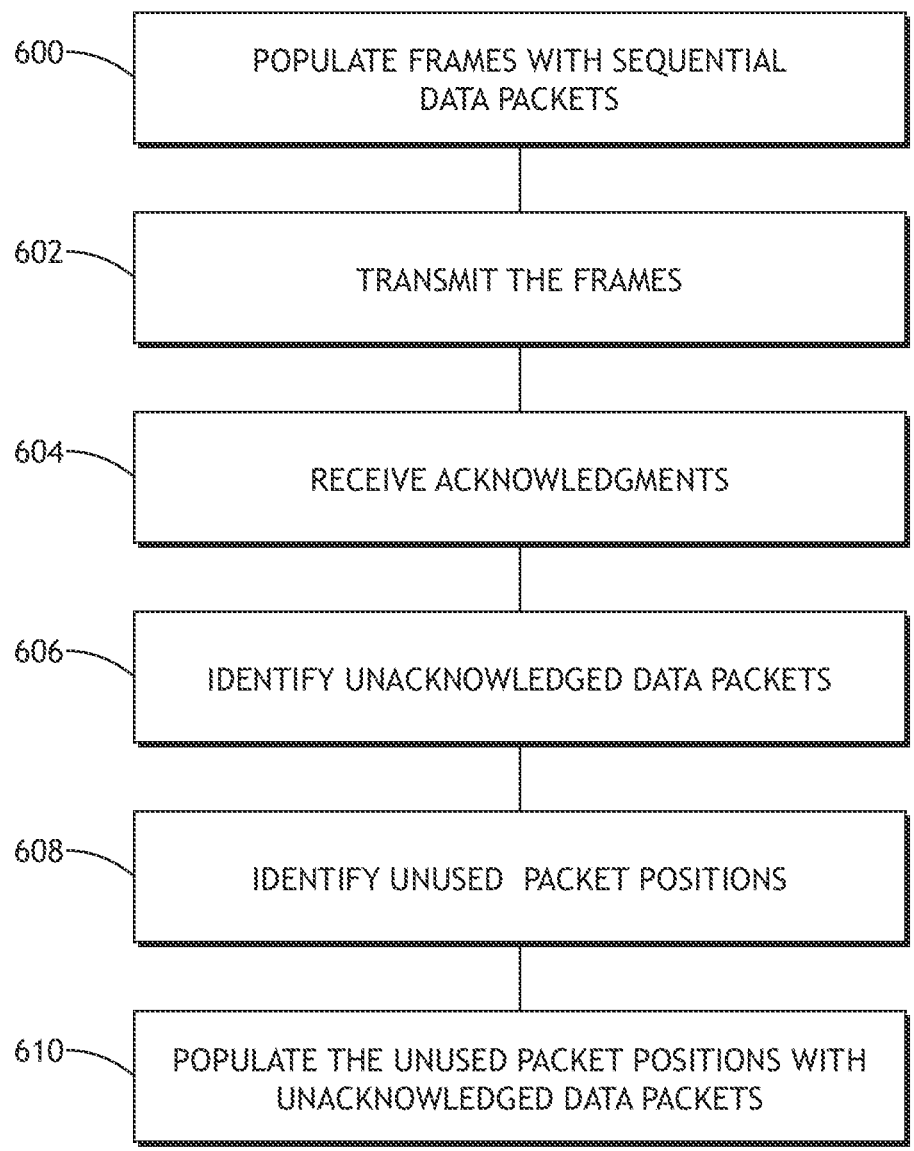
FIG. 6 shows a flowchart of a method for retransmitting unacknowledged data packets according to an exemplary embodiment.

Referring to FIG. 6, a flowchart of a method for retransmitting unacknowledged data packets according to an exemplary embodiment is shown. A processor executing the method populates 600 an HDL frame with sequential data packets, transmits 602 the HDL frame, and receives 604 one or more acknowledgements that the data packets have been received.

The processor identifies 606 unacknowledged data packets and repopulates the corresponding HDL packet positions with those unacknowledged data packets. The processor also identifies 608 unused HDL packet positions that would be populated with data packets having overlapping sequence numbers with the unacknowledged data packets if populated with new data.

The processor populates 610 the unused HDL packet positions with copies of the unacknowledged data packets in order according to sequence number. In one embodiment, the copies of the unacknowledged data packets may be weighted toward the lowest sequence number unacknowledged data packets, or consist entirely of the lowest sequence number unacknowledged data packet.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a data link device; and
   at least one processor in data communication with the data link device and a memory storing processor executable code for configuring the at least one processor to:
   populate a first high-throughput data link (HDL) frame with a plurality of data packets, each associated with an HDL packet position;
   transmit the HDL frame via the data link device;
   receive, via the data link device, a plurality of acknowledgements, each associated with an HDL packet position in the first HDL frame;
   identify one or more unacknowledged HDL packet positions;
   populate a second HDL frame with data packets corresponding to the one or more unacknowledged HDL packet positions in the corresponding HDL packet position, and with a plurality of new data packets;
   identify one or more unused HDL packet positions in the second HDL frame; and
   populate one or more of the unused HDL packet positions with a lowest sequence data packet of the data packets corresponding to the one or more unacknowledged HDL packet positions.

2. The computer apparatus of claim 1, wherein populating one or more of the unused HDL packet positions with the lowest sequence data packet in the data packets corresponding to the one or more unacknowledged HDL packet positions comprises replicating the lowest sequence data packet in all of the unused HDL packet positions.

3. The computer apparatus of claim 1, wherein the at least one processor is further configured to populate one or more of the unused HDL packet positions with a second lowest sequence data packet in the data packets corresponding to the one or more unacknowledged HDL packet positions.

4. The computer apparatus of claim 3, wherein the lowest sequence data packet populates more unused HDL packet positions than the second lowest sequence data packet.

5. The computer apparatus of claim 1, wherein the at least one processor is further configured to uniquely populate the one or more unused HDL packet positions with data packets in the data packets corresponding to the one or more unacknowledged HDL packet positions in order according to a sequence number associated with each data packet.

6. The computer apparatus of claim 1, wherein the HDL frame comprises one of an HDL-3 frame, an HDL-6 frame, an HDL-12 frame, or an HDL-24 frame.

7. A method comprising:
   populating a first high-throughput data link (HDL) frame with a plurality of data packets, each associated with an HDL packet position;
   transmitting the HDL frame;

receiving a plurality of acknowledgements, each associated with an HDL packet position in the first HDL frame;

identifying one or more unacknowledged HDL packet positions;

populating a second HDL frame with data packets corresponding to the one or more unacknowledged HDL packet positions in the corresponding HDL packet position, and with a plurality of new data packets;

identifying one or more unused HDL packet positions in the second HDL frame; and populating one or more of the unused HDL packet positions with a lowest sequence data packet of the data packets corresponding to the one or more unacknowledged HDL packet positions.

8. The method of claim 7, wherein populating one or more of the unused HDL packet positions with the lowest sequence data packet in the data packets corresponding to the one or more unacknowledged HDL packet positions comprises replicating the lowest sequence data packet in all of the unused HDL packet positions.

9. The method of claim 7, further comprising populating one or more of the unused HDL packet positions with a second lowest sequence data packet in the data packets corresponding to the one or more unacknowledged HDL packet positions.

10. The method of claim 9, wherein the lowest sequence data packet populates more unused HDL packet positions than the second lowest sequence data packet.

11. The method of claim 7, further comprising uniquely populating the one or more unused HDL packet positions with data packets in the data packets corresponding to the one or more unacknowledged HDL packet positions in order according to a sequence number associated with each data packet.

12. The method of claim 7, wherein the HDL frame comprises one of an HDL-3 frame, an HDL-6 frame, an HDL-12 frame, or an HDL-24 frame.

13. The method of claim 7, further comprising:
receiving an acknowledgement corresponding to one or more of the populated, unused HDL packet positions; and sliding a send window to populate a subsequent HDL frame with a new data packet having a sequence number overlapping with a data packet corresponding to the acknowledgment.

14. A communication system comprising:
a data link device; and
at least one processor in data communication with the data link device and a memory storing processor executable code for configuring the at least one processor to:
populate a first high-throughput data link (HDL) frame with a plurality of data packets, each associated with an HDL packet position;
transmit the HDL frame via the data link device;
receive, via the data link device, a plurality of acknowledgements, each associated with an HDL packet position in the first HDL frame;

identify one or more unacknowledged HDL packet positions;

populate a second HDL frame with data packets corresponding to the one or more unacknowledged HDL packet positions in the corresponding HDL packet position, and with a plurality of new data packets;

identify one or more unused HDL packet positions in the second HDL frame; and populate one or more of the unused HDL packet positions with a lowest sequence data packet of the data packets corresponding to the one or more unacknowledged HDL packet positions.

15. The communication system of claim 14, wherein populating one or more of the unused HDL packet positions with the lowest sequence data packet in the data packets corresponding to the one or more unacknowledged HDL packet positions comprises replicating the lowest sequence data packet in all of the unused HDL packet positions.

16. The communication system of claim 14, wherein the at least one processor is further configured to populate one or more of the unused HDL packet positions with a second lowest sequence data packet in the data packets corresponding to the one or more unacknowledged HDL packet positions.

17. The communication system of claim 16, wherein the lowest sequence data packet populates more unused HDL packet positions than the second lowest sequence data packet.

18. The communication system of claim 14, wherein the at least one processor is further configured to uniquely populate the one or more unused HDL packet positions with data packets in the data packets corresponding to the one or more unacknowledged HDL packet positions in order according to a sequence number associated with each data packet.

19. The communication system of claim 14, wherein the HDL frame comprises one of an HDL-3 frame, an HDL-6 frame, an HDL-12 frame, or an HDL-24 frame.

20. The communication system of claim 14, wherein the at least one processor is further configured to:
receive an acknowledgement corresponding to one or more of the populated, unused HDL packet positions; and slide a send window to populate a subsequent HDL frame with a new data packet having a sequence number overlapping with a data packet corresponding to the acknowledgment.

* * * * *